US008432667B2

(12) United States Patent
Strauser

(10) Patent No.: US 8,432,667 B2
(45) Date of Patent: *Apr. 30, 2013

(54) SYSTEM, METHOD AND APPARATUS FOR SUPPORTING AND PROVIDING POWER TO A MUSIC PLAYER

(76) Inventor: Jack Strauser, Pinellas Park, FL (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/889,983

(22) Filed: Sep. 24, 2010

(65) Prior Publication Data
US 2012/0283859 A1    Nov. 8, 2012

Related U.S. Application Data

(63) Continuation-in-part of application No. 12/699,078, filed on Feb. 3, 2010, now Pat. No. 8,116,077.

(51) Int. Cl.
*H05K 7/14* (2006.01)

(52) U.S. Cl.
USPC .................. 361/679.01; 361/679.41; 248/201

(58) Field of Classification Search ............. 361/679.01, 361/679.02, 679.41, 679.55–679.58; 455/575.1–575.4; 379/433.11–433.13; D14/496, D14/497; 248/316.7, 201; 700/94
See application file for complete search history.

(56) References Cited

U.S. PATENT DOCUMENTS

| | | | |
|---|---|---|---|
| 6,483,698 B1 * | 11/2002 | Loh | 361/679.41 |
| 6,788,528 B2 * | 9/2004 | Enners et al. | 361/679.41 |
| 6,815,600 B2 * | 11/2004 | Georges et al. | 84/609 |
| D513,938 S | 1/2006 | Griffin | |
| 7,502,225 B2 * | 3/2009 | Solomon et al. | 361/679.41 |
| 7,627,343 B2 * | 12/2009 | Fadell et al. | 455/557 |
| 2004/0150944 A1 | 8/2004 | Byrne et al. | |
| 2006/0116009 A1 | 6/2006 | Langberg et al. | |
| 2006/0127034 A1 | 6/2006 | Brooking et al. | |
| 2006/0181840 A1 | 8/2006 | Cvetko | |
| 2006/0250764 A1 | 11/2006 | Howarth et al. | |
| 2006/0280045 A1 * | 12/2006 | Ritsher et al. | 369/30.01 |
| 2007/0101039 A1 * | 5/2007 | Rutledge et al. | 710/303 |
| 2009/0292851 A1 | 11/2009 | Mead et al. | |

FOREIGN PATENT DOCUMENTS

| | | |
|---|---|---|
| KR | 10-2002-0017647 A | 3/2002 |
| KR | 10-0884503 B1 | 2/2009 |
| KR | 10-2009-0116275 A | 11/2009 |
| WO | 2004-029891 A1 | 4/2004 |

* cited by examiner

*Primary Examiner* — Jinhee Lee
*Assistant Examiner* — Ingrid Wright
(74) *Attorney, Agent, or Firm* — Larson & Larson, P.A.; Frank Liebenow; Justin P. Miller

(57) ABSTRACT

An audio device supports a variety of digital music players and includes a cradle that physically holds any of a plurality of digital music players. A power port on the audio device provides power to a selected one of the digital music players, through a cable that is specific to the selected digital music player through a cable that connects between the power port and the selected digital music player while the selected digital music player is held within the cradle.

17 Claims, 8 Drawing Sheets

SYSTEM, METHOD AND APPARATUS FOR SUPPORTING AND PROVIDING POWER TO A MUSIC PLAYER

CROSS-REFERENCE TO RELATED APPLICATION

This application is related to a co-pending application, filed even date, 12/889,941, titled, "SYSTEM, METHOD AND APPARATUS FOR DIRECTIONAL SPEAKERS". This application is also related to a co-pending application, filed even date, 12/889,951, titled, "SYSTEM, METHOD AND APPARATUS FOR HOLDING A DEVICE AND CONTAINING A MICROPHONE."

This application is a continuation-in-part of co-pending application Ser. No. 12/699,078, filed on Feb. 3, 2010 and titled "DIGITAL MUSIC PLAYER CRADLE ATTACHMENT", the content of which is included by reference.

FIELD

This invention relates to the field of audio devices and more particularly to an audio system with a cradle for supporting digital music players and providing power to such.

BACKGROUND

Many existing audio devices such as portable stereo systems and portable karaoke systems have cradles that accept portable music players. In such, the portable music player connects through a plug in the cradle that is proprietary to the audio device. Power is provided to the portable music player through the jack and audio is communicated from the portable music player to the audio device through the jack.

Being that the plug is an integral part of the cradle; the cradle/jack system only operates for one or a limited number of portable music players. For example, some recent audio devices have a cradle that only accepts a certain portable music player such as an iPOD Nano. If it is desired to use a different portable music player, there is no way to connect and/or support the different portable music player through the cradle/jack system. Instead, the non-supported portable music player must be connected to audio inputs through audio cables and, since it does not fit in the cradle, it rests on a nearby surface. The non-supported portable music player does not receive power through the audio cables and requires an additional cable to a source of power such as a wall-wart power supply.

What is needed is an audio system that holds and provides power directly to a variety of possible devices when one of such devices are supported in a cradle.

SUMMARY

In one embodiment, an audio system that supports a plurality of digital music players of different sizes is disclosed including a cradle that has a cavity that supports at least one of the digital music player. The cradle has a cavity for accepting a connector and the connector interfaces to the digital music player and passes power to the digital music player. The audio system has a power port for providing power to the connector through a wire, and, therefore, power to the digital music player. The cradle includes a base for supporting the cavity. The cavity is in an upper surface of the base and accepts an end portion of a largest digital music player of the plurality digital music players. A support wall extends from an upper rear surface of the base for supporting one of the digital music players and there is at least one ledge within the cavity. The at least one ledge forms decreasingly sized sub-openings towards a bottom of the cavity, whereas each sub-opening is sized corresponding to a different one of the plurality of digital music players.

In another embodiment, a method of supporting digital music players in an audio system is disclosed including providing a cradle for supporting the digital music player. A base of the cradle is attached to the audio system. The cradle has a cavity for accepting an end portion of the digital music player. The method includes connecting a first digital music player to a first end of a data cable and connecting a second end of the data cable to a power port of the audio system. The first digital music player is placed into the cavity and one or more audio cables are connected between the first digital music player and the audio system. The cavity accepts and holds an end portion of a largest digital music player and has a support wall extending from an upper rear surface of the base for supporting one of multiple digital music players at a time. At least one ledge is formed within the cavity. The ledge(s) form decreasingly sized sub-openings towards a bottom of the cavity, whereas each ledge/sub-opening is sized to hold a different one of the multiple digital music players.

In another embodiment, an audio device that supports a variety of digital music players is disclosed. The audio device includes a cradle that physically holding any of the digital music players. A power port on the audio device provides power to a selected digital music player, through a cable that is specific to that digital music player. The cable connects between the power port and the selected digital music player while the elected digital music player is held within the cradle. The cradle has a base, a system for accepting an end portion of a digital music player of the multiple digital music players, and wall for supporting the digital music player extending from an upper surface of the base. The system for accepting has a stepping for supporting multiple digital music players within the system for supporting the digital music player. The stepping supports the multiple digital music players and includes at least one ledge that forms decreasing sized sub-openings towards a bottom of the means for supporting the digital music player, whereas each sub-opening is sized to hold a different one of the multiple digital music players.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
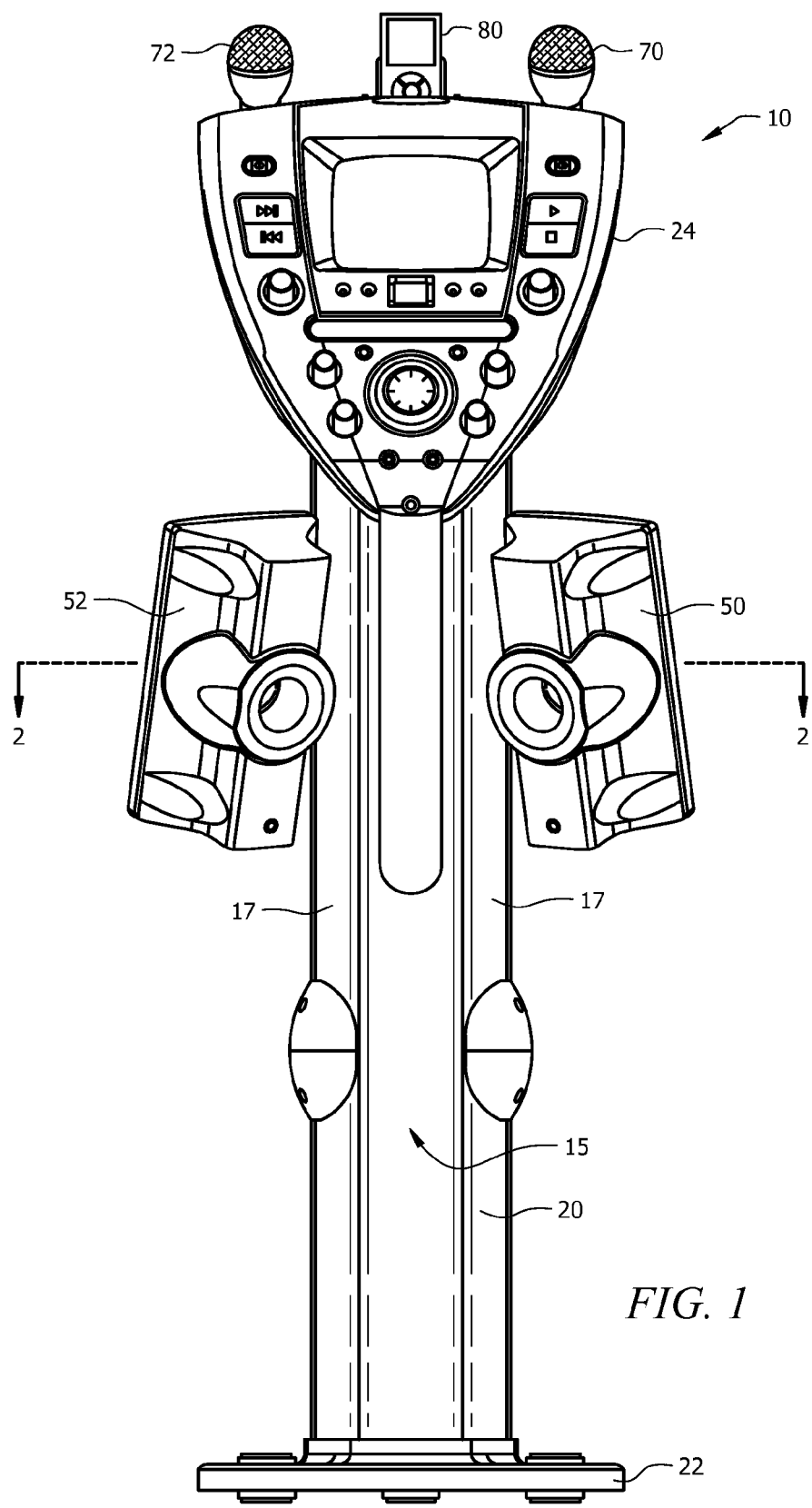
FIG. 1 illustrates a front perspective view of a directional speaker system.

Reference will now be made in detail to the presently preferred embodiments of the invention, examples of which are illustrated in the accompanying drawings. Throughout the following detailed description, the same reference numerals refer to the same elements in all figures.

Figure 2A:
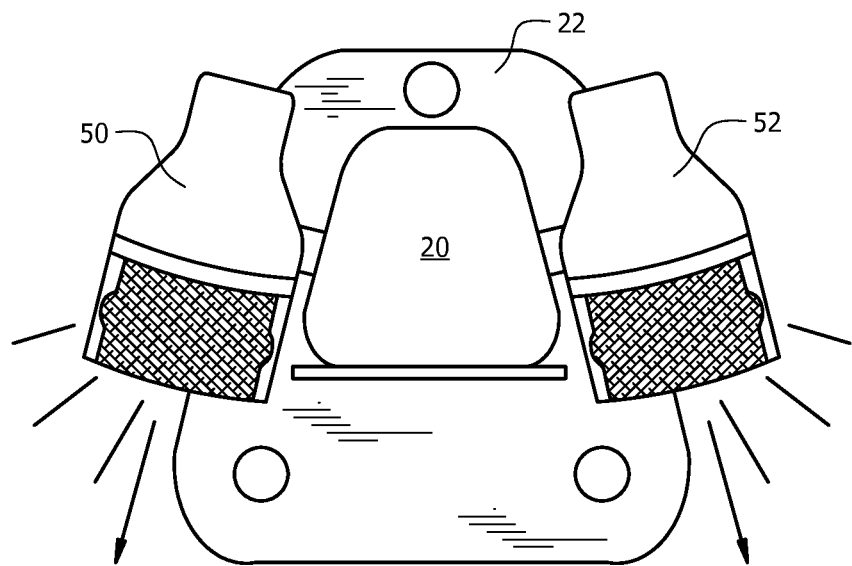
FIG. 2A illustrates a top view of the directional speaker system with speakers facing an audience.
Figure 2B:
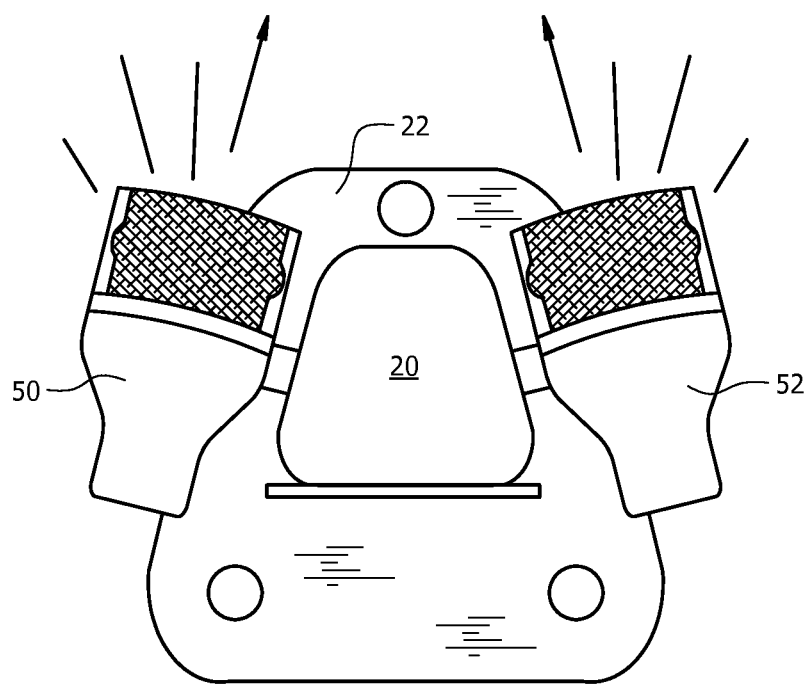
FIG. 2B illustrates a top view of the directional speaker system with speakers facing a performer.

Referring to FIGS. 1, 2A, 2B, perspective view of a directional speaker system is shown. For explanation purposes, a pedestal karaoke system 10 is used as an exemplary audio device. The elements of the disclosed invention are applicable to other portable and/or stationary devices and are not limited to a karaoke system.

Figure 7:
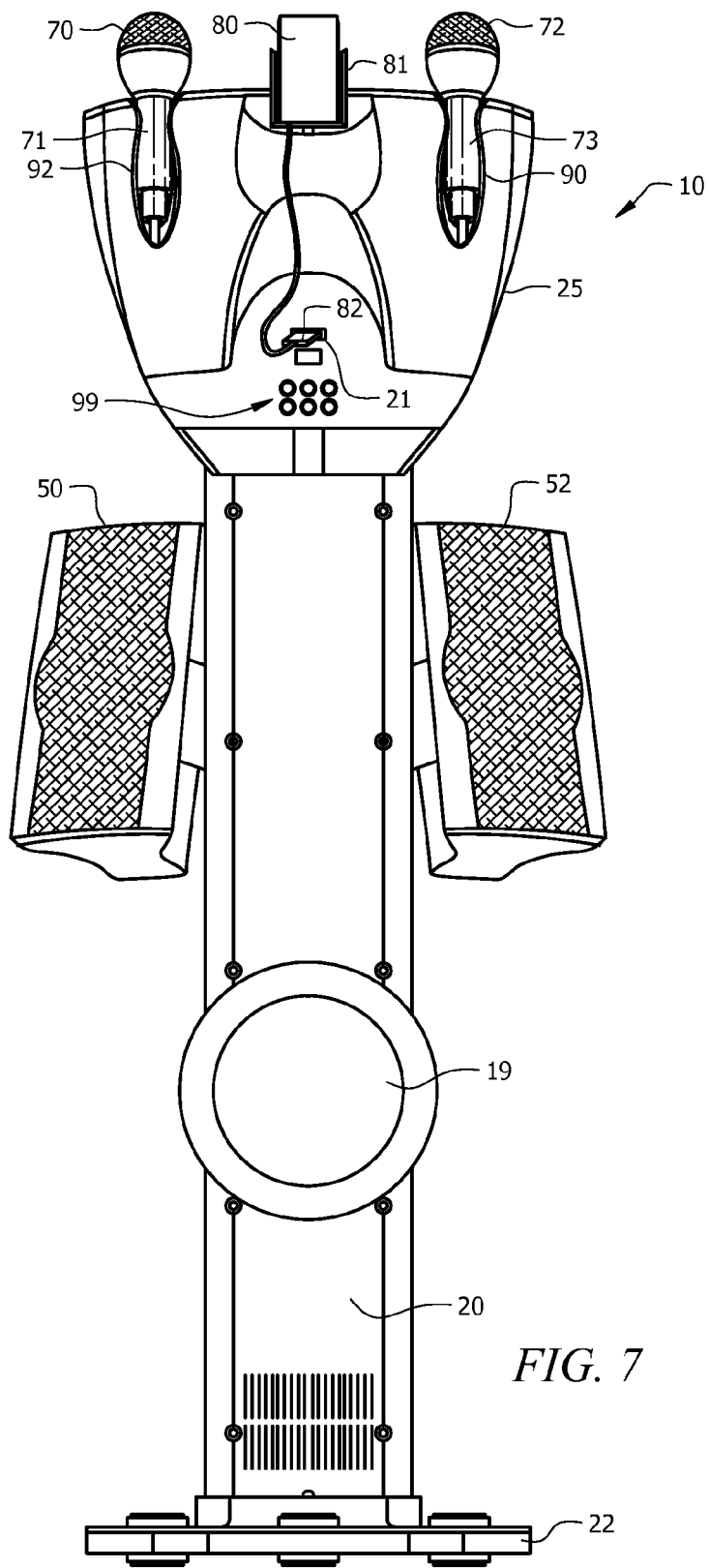
FIG. 7 illustrates a rear perspective view of the system.
Figure 8:
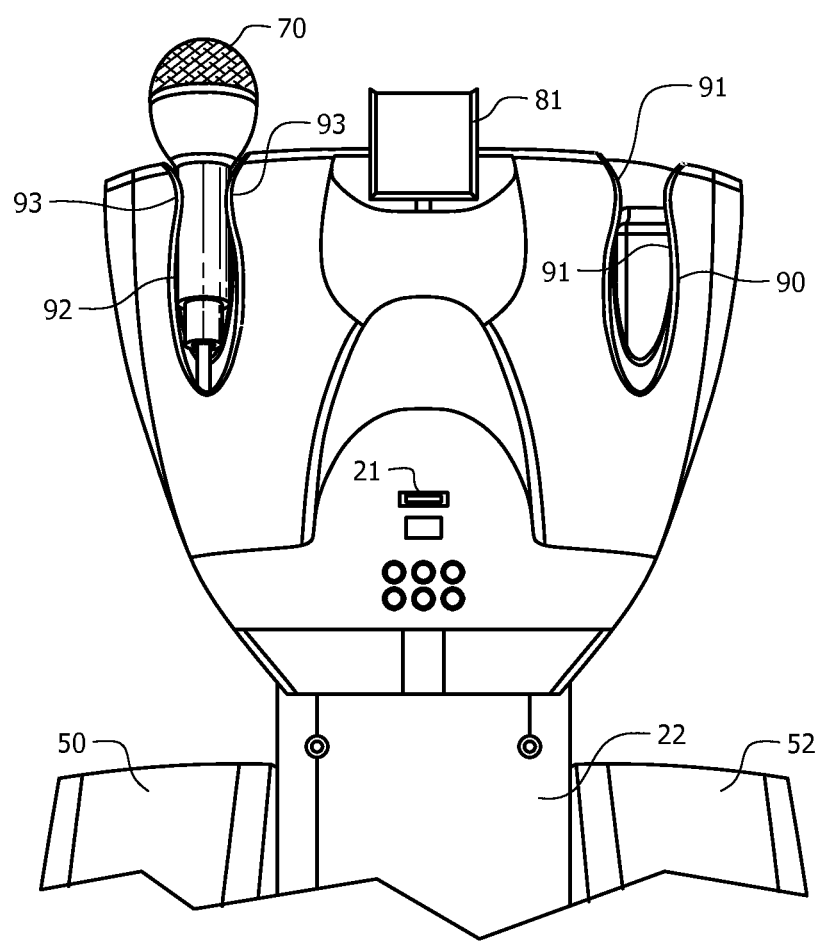
FIG. 8 illustrates a rear perspective view of the system showing handle/microphone storage in detail.
Figure 9:
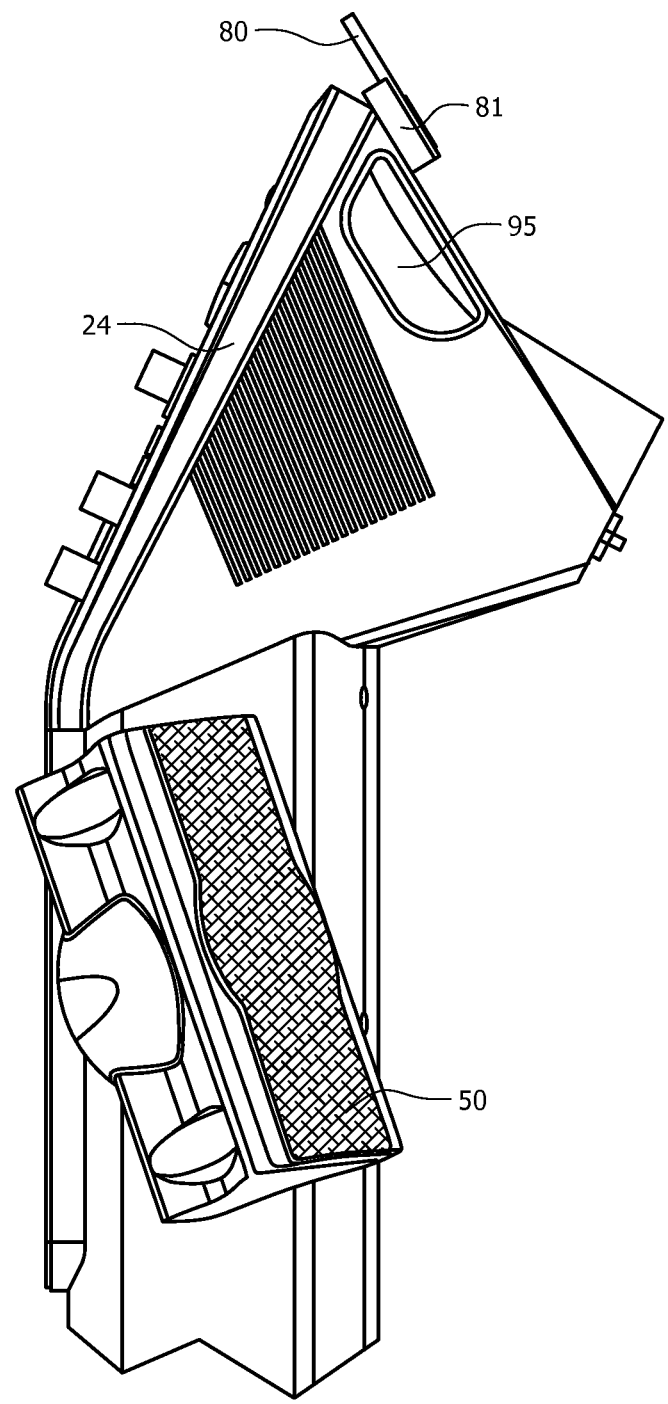
FIG. 9 illustrates a side perspective view of the system.

The exemplary audio device (system) 10 has a system console 24 supported by a pedestal 20. The system console 24 typically has controls (e.g. volume, play, stop, etc), displays and indicators. In this exemplary system 10, music or karaoke content comes from a digital music player 80 that is inserted into a cradle 81 (see FIG. 8) and connected to audio inputs 99 of the exemplary system 10. In this example, there are two microphones 70/72 in dual-purpose handle/microphone holders 90/92 (see FIG. 7).

In a preferred embodiment, the cradle 81 is stepped as disclosed in the parent application, "DIGITAL MUSIC PLAYER CRADLE ATTACHMENT," which is included by reference. Thereby, the cradle 81 supports a large variety of music players 80 of varying sizes and shapes. In such, the music player 80 sits in a cradle 81. Power is provided from a power port (e.g. USB port) 21, into which the power cable plug 82 (e.g. USB plug) is connected to provide power to the music player 80. Although not shown, audio from the music player is connected to the audio input jacks 99 of the system 10. In this way, the system 10 supports many different music players 80 from one or more manufactures and having different sizes, thicknesses and shapes. It is anticipated that the power cable/plug 82 is supplied by the manufacturer of the music player 80 since the music player end of the cable/plug 82 is often terminated with a proprietary connector.

The system is supported by a base 22, preferably wider than the pedestal 20 to reduce the probability of tipping.

The pedestal 20 has side walls 17. Preferably, the side walls 17 of the pedestal 20 are not parallel and purposely angle towards each other getting closer towards the front of the pedestal 15, where the user typically stands. Two speakers 50/52 are rotatably mounted to the side walls 17 of the pedestal 20. The speakers 50/52 are rotated to face away from the user (performer) as shown in FIG. 2A when the user (performer) is using the system 10 with other people (e.g. an audience). Since the speakers 50/52 are angled outwardly due to the angle of the side walls 17, sound from the speakers 50/52 diverge and produce sound that is better distributed to multiple listeners (e.g. the audience). The speakers 50/52 are rotated to face the user (performer) as shown in FIG. 2 when the user (performer) is not concerned with other people hearing the performance. Since the speakers 50/52 are angled inwardly due to the angle of the side walls 17, sound from the speakers 50/52 converge to a point near the user (performer) and produce sound that is concentrated for the enjoyment of the user (performer).

Note that other mechanisms are anticipated that provide the same feature in which the speakers are directed outwardly (sound is aimed away from straight ahead) when facing away from the performer and in which the speakers are directed inwardly (sound is aimed to a focal point near the performer) when facing the performer. For example, in some embodiments, the sides of the pedestal 20 are parallel, but the rotating posts that support the speakers 50/52 are at an angle with respect to the side walls of the pedestal 20. In some embodiments, more than two rotatable speakers 50/52 are anticipated (not shown).

Figure 3:
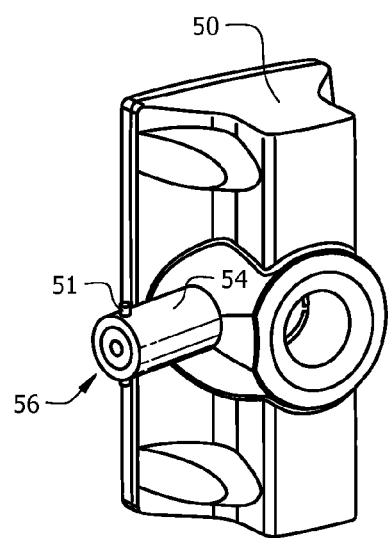
FIG. 3 illustrates a perspective view of a keyed rotating attachment system.
Figure 4:
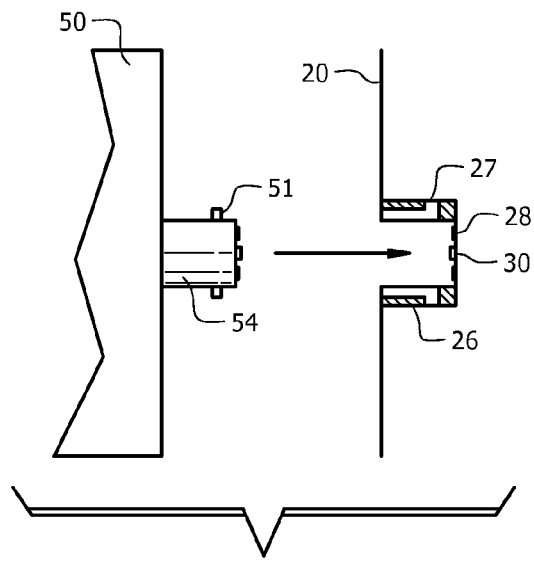
FIG. 4 illustrates a cutaway view of a keyed rotating attachment system.
Figure 5:
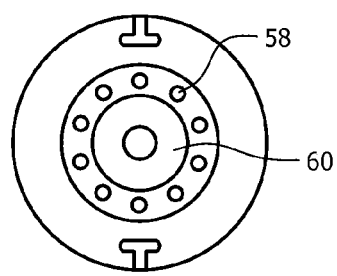
FIG. 5 illustrates a perspective view of an electrical interface of the rotating attachment system.
Figure 6:
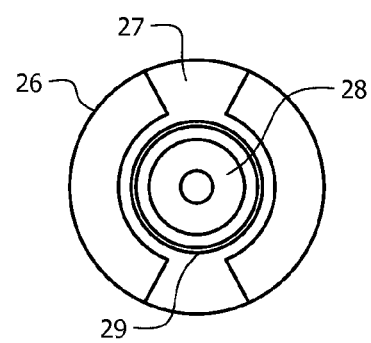
FIG. 6 illustrates a perspective view of a mating electrical interface of the rotating attachment system.

Referring to FIGS. 3-6, views of a keyed rotating attachment system is shown. In FIG. 3, only one speaker 50 is shown (more than one speaker is anticipated). The speaker 50 has a rotating support post 54 that has one or more key posts 51, In some embodiments, a speaker electrical interface 56 is provided to connect the speaker 50/52 to the audio outputs of the system 10 (details shown in FIGS. 5 and 6). The key posts 51 slide into slots 27 of a cavity 26 of the system 10 when the speaker 50/52 is, for example, horizontal (90 degrees rotated from the position shown in FIG. 1). Once inserted, the speakers 50/52 are rotated toward the audience (diverging) or toward the performer (converging), thereby locking the key posts 51 into the slots 27. Any other way of a rotatable connection is anticipated, permanent or removable.

In some embodiments, electrical connections are provided to connect the speakers 50/52 to the audio outputs of the system 10. There are many ways known to electrically connect a rotating device (e.g. a wind generator is rotatably mounted to a tower and electricity passes through the rotatable interface from the generator to the electrical connections at the ground). The example shown has two sets of connectors 58/60 on the speaker support post 54 that connect to contacts 28 and 29 in the cavity 26.

Alternately, in some embodiments, the speakers 50/52 are electrically connected to the system 10 by wires (not shown) instead of through electrical connections associated with the rotating connection.

Referring to FIGS. 7-10, perspective views of the system showing the combined handle/microphone feature will be described. In some embodiments, a music player 80 provides content (e.g. music, karaoke content, video, etc). In such, the music player 80 sits in a cradle 81. For convenience, a power port (e.g. USB port) 21 is provided, into which the power cable plug 82 (e.g. USB plug) is connected to provide power to the music player 80. Although not shown, audio from the music player is connected to the audio input jacks 99 of the system 10.

In some embodiments, the system 10 includes a base speaker 19 (e.g. a sub-woofer), preferably mounted in the pedestal 20.

Figure 10:
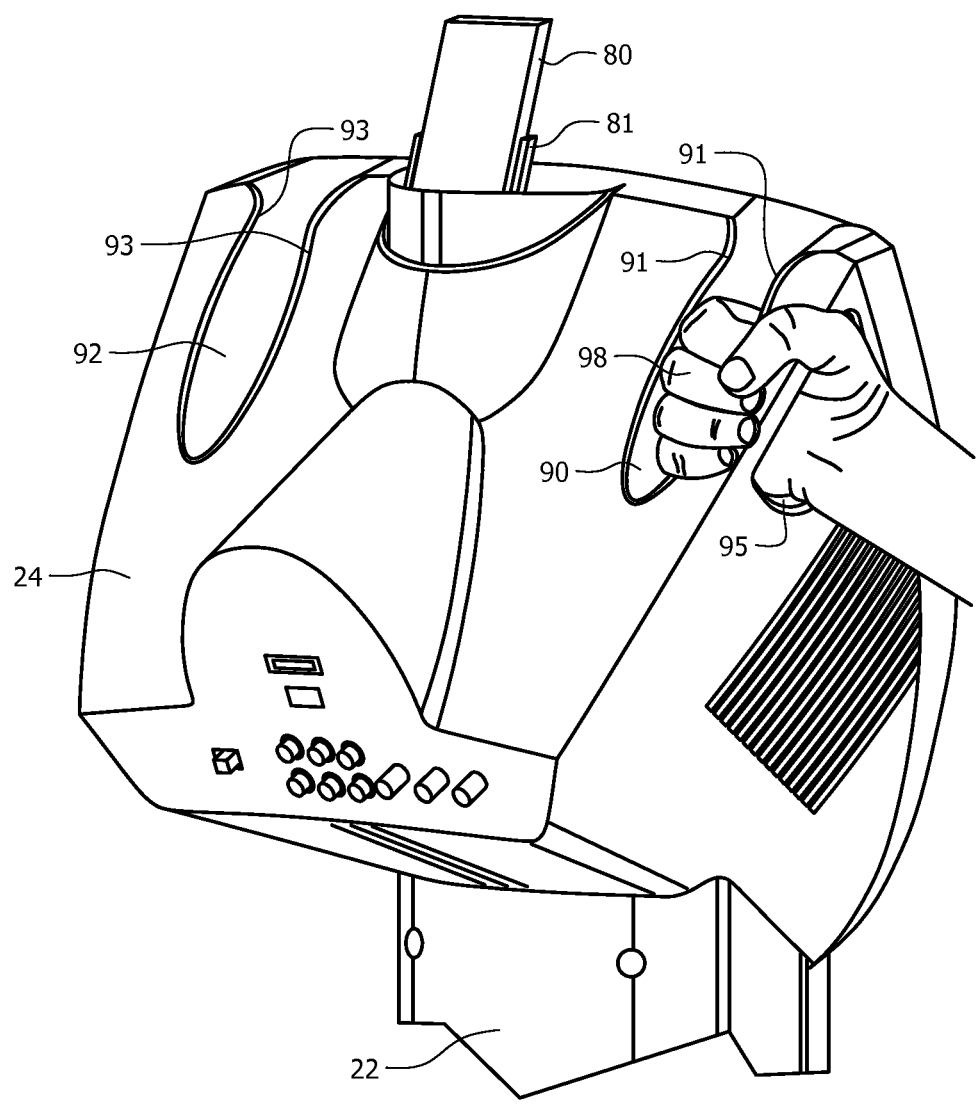
FIG. 10 illustrates a rear perspective view of the system showing handle/microphone in use as a handle.

Handles 71/73 of the microphones 70/72 are inserted into microphone holders 90/92 that double as handles 90/92. A convex surface 91/93 of the microphone holders 90/92 that double as handles 90/92 keeps the microphone handles 71/73 from falling out while providing enough of an opening for a persons fingers 98 (see FIG. 10) when using the microphone holders 90/92 that double as handles 90/92 as handles as shown in FIG. 10. The sides of the system console 24 has a handle opening 95 through which the user's fingers 98 fit, wrapping through and out of the microphone holders 90/92 that double as handles 90/92. The shape of the handle 90/91/92/93/95 is preferably, though not required, shaped to comfortably interface with a typical hand and fingers 98 of a person who carries the system 10.

Figure 11:
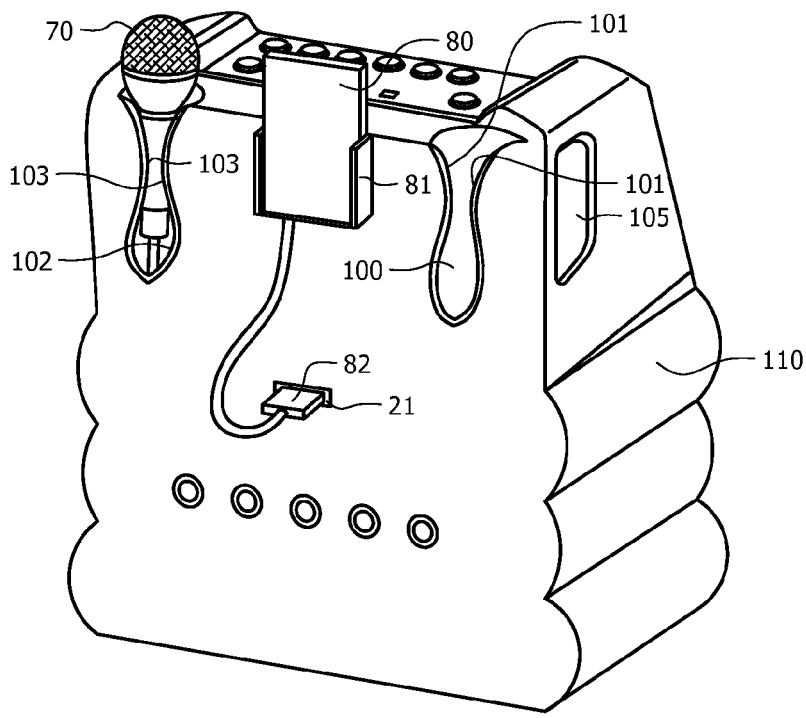
FIG. 11 illustrates a rear perspective view of another exemplary system showing handle/microphone storage in detail.
Figure 12:
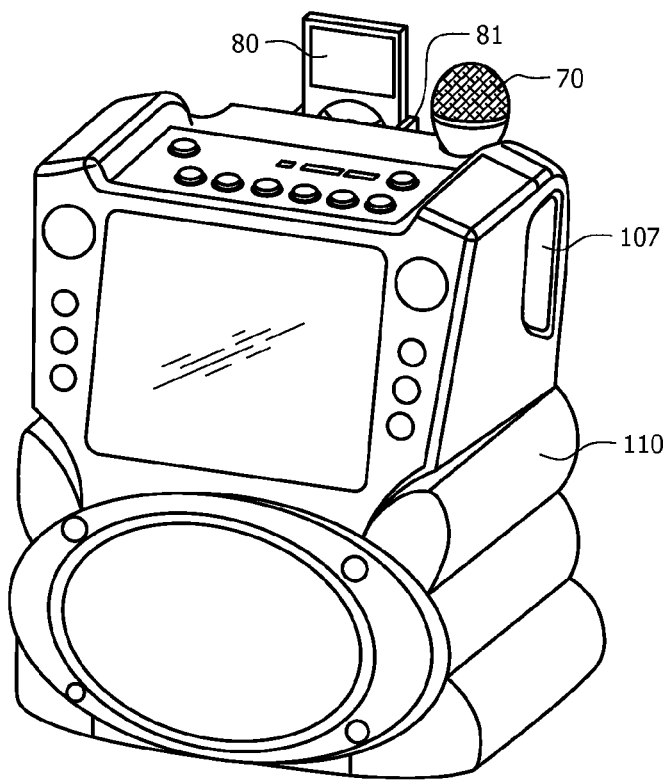
FIG. 12 illustrates a front perspective view of the second exemplary system showing a microphone in storage.

Referring to FIGS. 11 and 12, perspective view of another exemplary system 110 showing handle/microphone storage 100/102 in detail will be described. For storage, the handles 71/73 of the microphones 70/72 (only one microphone 70 is shown) are inserted into microphone holders 100/102 that double as handles 100/102. A convex surface 101/103 of the microphone holders 100/102 that double as handles 100/102 keeps the microphone handles 71/73 from falling out while providing enough of an opening for a persons fingers when using the microphone holders 100/102 that double as handles 100/102 as handles as shown in FIG. 11. The sides of the exemplary system 110 has a handle opening 105/107 through which the user's fingers 98 fit, wrapping through and out of the microphone holders 100/102 that double as handles 100/102. The shape of the handle 100/101/102/103/105/107 is preferably, though not required, shaped to comfortably interface with a typical hand and fingers 98 of a person who carries the system 110.

In this exemplary system 110, music or karaoke content comes from a music player 80 that is inserted into a cradle 81 and connected to audio inputs of the exemplary system 110. In this example, there is one microphone 70 in a first dual-purpose handle/microphone holder 100 and the second dual-purpose handle/microphone holder 102 is empty.

In a preferred embodiment, the cradle 81 is stepped as disclosed in the parent application, "DIGITAL MUSIC PLAYER CRADLE ATTACHMENT," which is included by reference. Thereby, the cradle 81 supports a large variety of music players 80 of varying sizes and shapes. In such, the music player 80 sits in a cradle 81. Power is provided from a power port (e.g. USB port) 21, into which the power cable plug 82 (e.g. USB plug) is connected to provide power to the music player 80. Although not shown, audio from the music player is connected to the audio input jacks of the system 110. In this way, the system 110 supports many different music players 80 from one or more manufactures and having different sizes, thicknesses and shapes. It is anticipated that the power cable/plug 82 is supplied by the manufacturer of the music player 80 since the music player end of the cable/plug 82 is often terminated with a proprietary connector.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An audio system that supports a plurality of digital music players of different sizes, the audio system comprising:
    a cradle, the cradle having a cavity to support at least one of the digital music players and the cradle having a cavity for accepting a connector, the connector interfacing to the digital music player and the connector passing power to the digital music player; and
    a power port on the audio system, the power port providing power to the connector through a wire to the digital music player;
    wherein the cradle comprises:
        a base for supporting the cavity, the cavity is in an upper surface of the base, the cavity accepts an end portion of a largest digital music player of the plurality digital music players;
        a support wall extending from an upper rear surface of the base for supporting one of the digital music players; and
        at least one ledge within the cavity, the at least one ledge forming decreasingly sized sub-openings towards a bottom of the cavity, whereas each sub-opening is sized corresponding to a different one of the plurality of digital music players.

2. The audio system of claim 1, wherein the multiple digital music players consists of a large-sized digital music player, a medium-sized digital music player and a small-sized digital music player.

3. The audio system of claim 1, wherein the support wall has at least one front-clip indentation running substantially horizontal on a front surface for supporting a clip-on digital music player.

4. The audio system of claim 1, wherein the cradle is attached to the audio system by a plurality of mounting brackets on the cradle and an equal number of mating slots on the audio system.

5. The audio system of claim 1, wherein the cradle is attached to the audio system by a plurality of mounting posts on the cradle and a plurality of mating key holes on the audio system.

6. A method of supporting digital music players in an audio system, the method comprising:
    providing a cradle for supporting the digital music player, the cradle comprising:
        a base, the base attached to the audio system;
        a cavity in an upper surface of the base, the cavity accepts and holds an end portion of the digital music player, the cavity accepts and holds an end portion of a largest digital music player; a support wall extends from an upper rear surface of the base for supporting one of multiple digital music players at a time; at least one ledge is within the cavity, the at least one ledge forms decreasingly sized sub-openings towards a bottom of the cavity, whereas each ledge/sub-opening is sized to hold a different one of the multiple digital music players;
    connecting a first digital music player to a first end of a data cable;
    connecting a second end of the data cable to a power port of the audio system;
    inserting the first digital music player into the cavity;
    connecting one or more audio cables between the first digital music player and the audio system;
    removing the first digital music player from the cavity;
    disconnecting first end of the data cable from the first digital music player;
    connecting a second digital music player of the multiple digital music players to the first end of the data cable, the second digital music player having a different size than the first digital music player; and
    inserting a first end of the second digital music player into the cavity in a second sub-opening of the sub-openings, a back side of the second digital music player resting against the support wall.

7. The method of claim 6 further comprising an attachment mechanism on a front surface of the base, the attachment mechanism connecting with a mating attachment mechanism on the audio system, thereby removably holding the cradle to the sound system.

8. The method of claim 7, wherein the support wall has at least one front-clip indentation running substantially horizontal on a front surface for supporting a clip-on digital music player and the support wall has at least one rear-clip indentation running substantially horizontal on a back surface for supporting the clip-on digital music player.

9. The method of claim 6, wherein the first digital music player is a large-sized digital music player and the second digital music player is a small-sized digital music player.

10. The method of claim 6, wherein the audio system is a Karaoke system.

11. The method of claim 6, wherein the data cable is a Universal Serial Bus cable.

12. An audio device that supports digital music players, the audio device comprising:
   a cradle, the cradle physically holding the digital music player, the cradle comprising a base, a means for accepting an end portion of a digital music player of the multiple digital music players, and a means for supporting the digital music player extending from an upper surface of the base, and a stepped means for supporting multiple digital music players within the means for supporting the digital music player, the stepped means for supporting the multiple digital music players including at least one ledge that forms decreasing sized sub-openings towards a bottom of the means for supporting the digital music player, whereas each sub-opening is sized to hold a different one of the multiple digital music players;
   a power port, the power port providing power that powers the digital music player, the power is provided through a cable that is specific to the digital music player and the cable connects between the power port and the digital music player that is held within the cradle.

13. The audio device of claim 12, wherein the cradle is removably attached to the audio device.

14. The audio device of claim 13, wherein the cradle is removably attached to the audio device by a plurality of mounting brackets on the cradle and a plurality of mating slots on the audio device.

15. The audio device of claim 13, wherein the cradle is removably attached to the audio device by a plurality of mounting posts on the cradle and a plurality of mating key holes on the audio device.

16. The digital music player cradle of claim 13, wherein the cradle is removably attached to the audio device by hook material on the cradle and loop material on the audio device.

17. The audio device of claim 12, wherein the multiple digital music players consists of a large-sized digital music player, a medium-sized digital music player and a small-sized digital music player.

* * * * *